(12) United States Patent
Manley

(10) Patent No.: US 9,253,968 B2
(45) Date of Patent: Feb. 9, 2016

(54) MULTI-FUNCTIONAL ROD FOUNDATION SYSTEM AND METHOD

(71) Applicant: Terry L. Manley, Frisco, TX (US)

(72) Inventor: Terry L. Manley, Frisco, TX (US)

(*) Notice: Subject to any disclaimer, the term of this patent is extended or adjusted under 35 U.S.C. 154(b) by 387 days.

(21) Appl. No.: 13/666,584

(22) Filed: Nov. 1, 2012

(65) Prior Publication Data

US 2014/0115946 A1 May 1, 2014

(51) Int. Cl.
*A01K 87/00* (2006.01)
*A01K 87/02* (2006.01)
*A01K 87/06* (2006.01)
*A01K 87/08* (2006.01)

(52) U.S. Cl.
CPC ............... *A01K 87/02* (2013.01); *Y10T 29/49* (2015.01); *Y10T 29/49826* (2015.01)

(58) Field of Classification Search
CPC ....... A01K 87/00; A01K 87/02; A01K 87/06; A01K 87/08
USPC ........................ 43/18.1 R, 18.1 CT, 22, 23, 25
See application file for complete search history.

(56) References Cited

U.S. PATENT DOCUMENTS

| | | | | |
|---|---|---|---|---|
| 1,839,751 A * | 1/1932 | Fenton | | 43/23 |
| 1,980,316 A * | 11/1934 | Breder | | 43/22 |
| 2,088,132 A * | 7/1937 | Domecq | | 43/23 |
| 3,811,215 A * | 5/1974 | Fleischer | | 43/18.1 CT |
| 3,876,320 A * | 4/1975 | Phillipson | | A01K 87/08 403/361 |
| 3,975,855 A * | 8/1976 | McKeown | | 43/23 |
| 4,083,141 A * | 4/1978 | Shedd et al. | | 43/22 |
| 4,607,975 A * | 8/1986 | Lo | | 403/24 |
| 4,637,157 A * | 1/1987 | Collins | | 43/22 |
| 4,747,227 A * | 5/1988 | Kress | | A01K 87/02 43/18.1 CT |
| 4,887,375 A * | 12/1989 | Shedd et al. | | 43/21.2 |
| 5,259,140 A * | 11/1993 | Epperson | | 43/18.1 CT |
| 5,369,904 A * | 12/1994 | Vogts et al. | | 43/18.1 R |
| 5,522,169 A * | 6/1996 | Heller | | A01K 87/08 43/18.1 CT |
| 7,086,195 B2 * | 8/2006 | Borgeat | | 43/18.1 CT |
| 7,210,264 B1 | 5/2007 | Demetris | | |
| 7,784,214 B2 * | 8/2010 | Mullane | | 43/22 |
| 8,595,972 B2 * | 12/2013 | Foss | | 43/17 |
| 2005/0034350 A1 * | 2/2005 | Foster | | 43/18.1 CT |
| 2006/0288630 A1 * | 12/2006 | Lin | | 43/22 |
| 2011/0271580 A1 | 11/2011 | Carse | | |

FOREIGN PATENT DOCUMENTS

| | | |
|---|---|---|
| GB | 577615 A | 5/1946 |
| GB | 2032743 A | 5/1980 |
| GB | 2259636 A | 3/1993 |
| WO | 2010033033 A1 | 3/2010 |

* cited by examiner

*Primary Examiner* — Christopher P Ellis
*Assistant Examiner* — Michael Wang
(74) *Attorney, Agent, or Firm* — Strasburger & Price, LLP

(57) ABSTRACT

A fishing rod foundation and methods for constructing and adjusting a fishing rig. The fishing rod foundation may include a cylindrical element inserted in a tubular, the tubular having at least three portions. The first portion and second portions may be configured to receive a rod blank. The third portion may be configured to provide a stop for fishing rod parts to be added to the fishing rod foundation exterior. The third portion may include a threaded section that engages a locking nut for locking and unlocking the position of the cylindrical element relative to the tubular. The method may include construction of a fishing rod by adding a rod blank and other parts to the fishing rod foundation. Another method may include adjusting the fishing rig using the locking/unlocking feature of the fishing rod foundation.

27 Claims, 4 Drawing Sheets

MULTI-FUNCTIONAL ROD FOUNDATION SYSTEM AND METHOD

BACKGROUND OF THE DISCLOSURE

1. Field of the Disclosure

This disclosure generally relates to the field of fishing, and, in particular, formation and assembly of fishing rods and rigs.

2. Description of the Art

Generally, fishing rigs are used for catching fish from an aquatic environment. Fishing rigs come in a wide variety and are often specialized for specific uses. Fishing rigs may be designed around optimizing characteristics such as ease of use, durability, reduced maintenance, effectiveness in competition, etc. While fishing, a user may require multiple fishing rigs, each optimized for different purposes (weight of lure, expected catch size, type of competition, etc.). Fishing rig dimensions may also vary based on user characteristics, including size of the user and arm length. Fishing rigs may include numerous elements, such as rod blanks, fishing line, fishing line guides, reel seats, butts, counterweights, etc. Fishing rigs are built around a rod blank that serves as an attachment point for other elements. However, rod blanks are typically made of flexible materials, such as fiber glass, which is subject to damage during handling and use and deterioration due to exposure to the environment. Since a rod blank has a fixed length, a fishing rig built around a rod blank will have a limited range of users (based on user size and arm length) and a fixed set of uses unless modified. Modification options for a fishing rig built around a rod blank are often limited based on properties of the rod blank and the need for complex equipment (manufacturing environment) to perform the modification. A broken rod blank may require factory equipment unavailable to the user. If a rod blank is damaged, the entire fishing rig must be rebuilt around a new rod blank. What is needed is a fishing rig foundation that is more robust than a rod blank to serve as the attachment point for the fishing rig elements, and may be assembled/modified by the user in the field.

BRIEF SUMMARY OF THE DISCLOSURE

In aspects, the present disclosure is related to a fishing rig and method of fishing. Specifically, the present disclosure is related to a fishing rig foundation that provides attachment points for fishing rig elements including a rod blank.

One embodiment according to the present disclosure includes a fishing rod foundation, comprising: a cylindrical element; a tubular configured to receive the cylindrical element, the tubular comprising: a first tubular portion with a first interior diameter greater than an exterior diameter of the cylindrical element, a second tubular portion adjacent to the first tubular portion with a second interior diameter smaller than the first interior diameter, and a third tubular portion with a threaded area and adjacent to the second tubular portion; and a locking nut configured to form an engagement with the threaded area of the third portion, the engagement having a first position and a second position, where the first position allows the cylindrical element to slide within the tubular and the second position restricts movement of the cylindrical element within the tubular.

Another embodiment according to the present disclosure includes a method of constructing a fishing rig, the method comprising: inserting a rod blank into a fishing rod foundation, wherein the fishing rod foundation comprises: a cylindrical element; a tubular configured to receive the cylindrical element, the tubular comprising: a first tubular portion with a first interior diameter greater than an exterior diameter of the cylindrical element, a second tubular portion adjacent to the first tubular portion with a second interior diameter smaller than the first interior diameter, and a third tubular portion with a threaded area and adjacent to the second tubular portion; and a locking nut configured to form an engagement with the threaded area of the third portion, the engagement having a first position and a second position, where the first position allows the cylindrical element to slide within the tubular and the second position restricts movement of the cylindrical element within the tubular.

Another embodiment according to the present disclosure includes a method of adjusting a fishing rig, wherein the fishing rig comprises: a cylindrical element; a tubular configured to receive the cylindrical element, the tubular comprising: a first tubular portion with a first interior diameter greater than an exterior diameter of the cylindrical element, a second tubular portion adjacent to the first tubular portion with a second interior diameter smaller than the first interior diameter, and a third tubular portion with a threaded area and adjacent to the second tubular portion; a locking nut configured to form an engagement with the threaded area of the third portion, the engagement having a first position and a second position, where the first position allows the cylindrical element to slide within the tubular and the second position restricts movement of the cylindrical element within the tubular; a rod blank disposed in the first portion; and a weight disposed on a portion of the cylindrical element extending beyond the tubular; and the method comprising: sliding the cylindrical element relative to the tubular to change a length of the extended portion from a first length to a second length.

Examples of the more important features of the disclosure have been summarized rather broadly in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIG. 3 shows a flow chart of a method for constructing a fishing rig using the fishing rod foundation according to one embodiment of the present disclosure; and.

DETAILED DESCRIPTION OF THE DISCLOSURE

Figure 1:
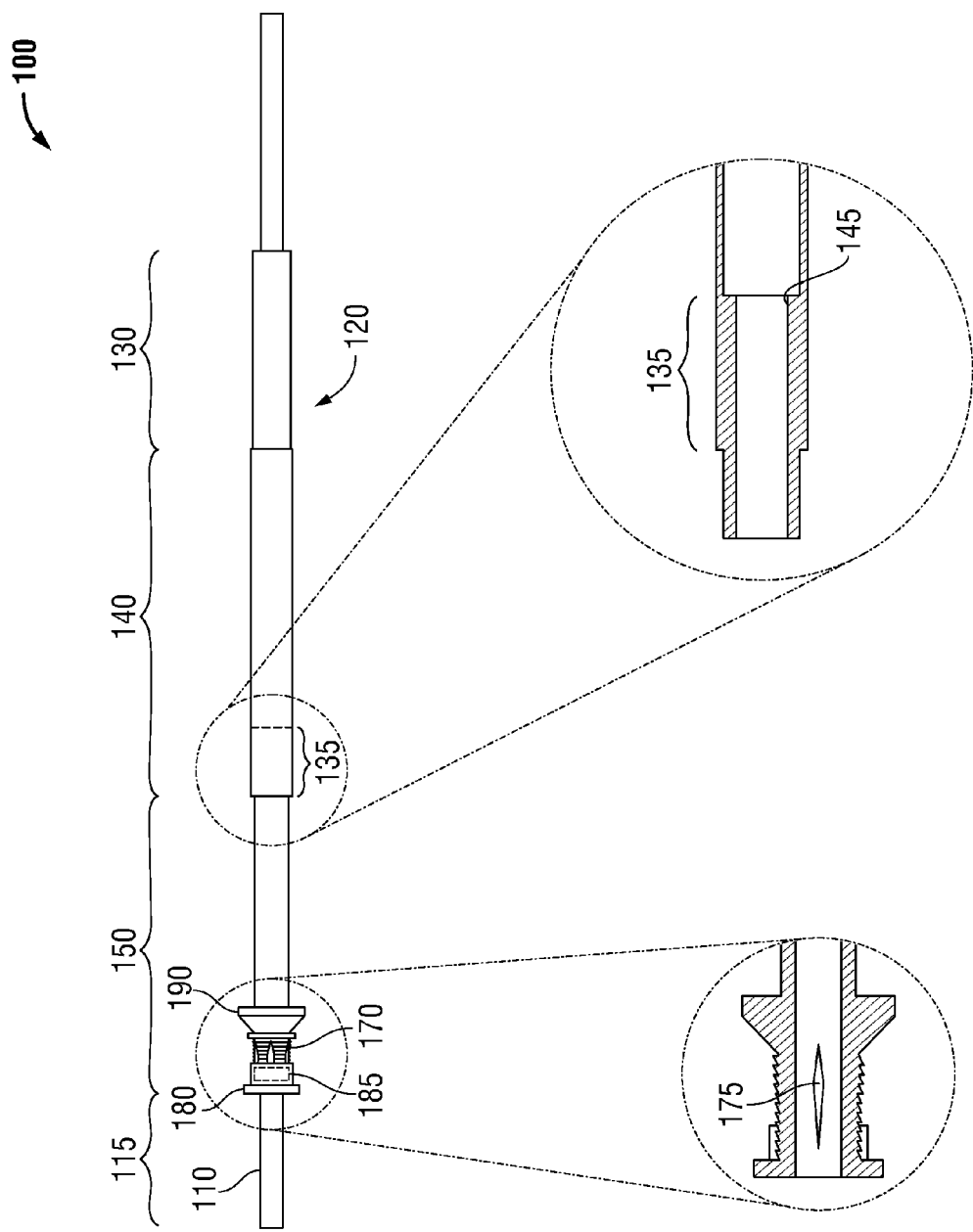
FIG. 1 shows a fishing rod foundation according to one embodiment of the present disclosure.

Generally, the present disclosure involves a fishing rig and method of fishing, specifically involving the use of a fishing rig foundation to provide a base for forming a fishing rig. The present disclosure is susceptible to embodiments of different forms. There are shown in the drawings, and herein will be described in detail, specific embodiments of the present disclosure with the understanding that the present disclosure is to be considered an exemplification of the principles of the present disclosure and is not intended to limit the present disclosure to that illustrated and described herein.

FIG. 1 shows a diagram of an exemplary fishing rod foundation 100 according to one embodiment of the present disclosure. The fishing rod foundation 100 may include a cylindrical element 110 configured for insertion into a tubular 120. The tubular 120 may include at least first portion 130, a second portion 140, and a third portion 150. One or more of the portions 130, 140, 150 may be dimensioned to allow the cylindrical element 110 to pass through. In some embodiments, the second portion 140 may be thickened to provide reinforcement and/or proper sizing for the attachment of standard fishing rod elements. In some embodiments, the first portion 130 and the second portion 140 may be distinguished by different exterior diameters. However, in some embodiments, the first portion 130 and the second portion 140 may have identical exterior diameters. The first portion 130 may have a first interior diameter that is large enough to receive a rod blank 210 (see FIG. 2). The at least part of the second portion 140 may include a section 135 with a second interior diameter. The section 135 may form a rod blank stop 145 and may have a diameter dimensioned to prevent the base of a rod blank 210 from passing from the second portion 140 to the third portion 150 when the rod blank 210 is inserted in the tubular 120 through the first portion 130. The narrowed interior diameter section 135 of the rod blank stop 145 of the second portion 140 may be configured to engage the cylindrical element 110 while still allowing the cylindrical element 110 to slide. While shown in FIG. 1 as part of the second portion 140, the narrowed section 135 may extend through the third portion 150 in some embodiments.

The third portion 150 may include a threaded section 170. The threaded section 170 may be configured as an angled screw lock for receiving a locking nut 180. The locking nut 180 may form an engagement with the threaded section 170 such that the engagement has a first position (unlocked) and a second position (locked). With the locking nut 180 in the first position, the cylindrical element 110 may slide freely through the third portion 150. With the locking nut 180 in the second position, at least part of the third portion 150 may be compressed sufficiently to prevent sliding movement of the cylindrical element 110 through the third portion 150. The third portion 150 may have a narrowed interior diameter similar to the narrowed interior diameter section 135 of the second portion 140 for at least part of its length. In some embodiments, the narrowed interior diameter of the third portion 150 is adjacent to an extended length 115 of the cylindrical element 110 that extends beyond the tubular 120. The third portion 150 may also include a stop 190, configured to prevent a sliding movement of a hand in contact with the second portion 140 from sliding to the threaded section 170. In some embodiments, a ring 185 may be disposed between the locking nut 180 and the cylindrical element 110. The ring 185 may be configured to compress the cylindrical element 110 when the locking nut 180 is tightened on the threaded section 170. The ring 185 may be configured to allow the cylindrical element 110 to slide when the locking nut 180 is not tightened. The ring 185 may be comprised of an elastomeric material. The ring 185 may be comprised of a material that will not scratch or abrade the cylindrical element 110 when the cylindrical element 110 slides through the ring 185. The ring 185 may include a ferrule.

In some embodiments, the cylindrical element 110 may comprise a solid rod, a rod that is at least partly hollow or a tubular. In some embodiments, the cylindrical element 110 and the tubular 120 may be made of a strong, lightweight material. Strong, lightweight materials may include aerospace aluminum, magnesium alloy, titanium, graphite, and other suitable materials having similar tensile strength and density as would be understood by one of skill in the art. In some embodiments, the threaded section 170 may include an opening 175 configured to allow compression of the threaded section 170 when locking nut 180 is tightened to the second position. In some embodiments, the tightening of the locking nut 180 may result in the interior diameter of the threaded section 170 to be reduced sufficiently to prevent sliding movement of the cylindrical element 110 through the threaded section 170.

In some embodiments, the tubular 120 may be formed of a single piece of material. In some embodiments, the tubular 120 may be formed from a lightweight material with sufficient strength to provide reinforcement to a rod blank 210 received into the first portion 130. While FIG. 1 shows a narrowed interior diameter section 135 within the second portion 140, this is exemplary and illustrative only, as the entirety of the second portion 140 may have a diameter that prevents the movement of the rod blank 210 into the second portion 140, or the narrowed interior diameter section 135 may reside within the second portion 140 where there are wider diameters on either side of the narrowed interior diameter section 135.

Figure 2:
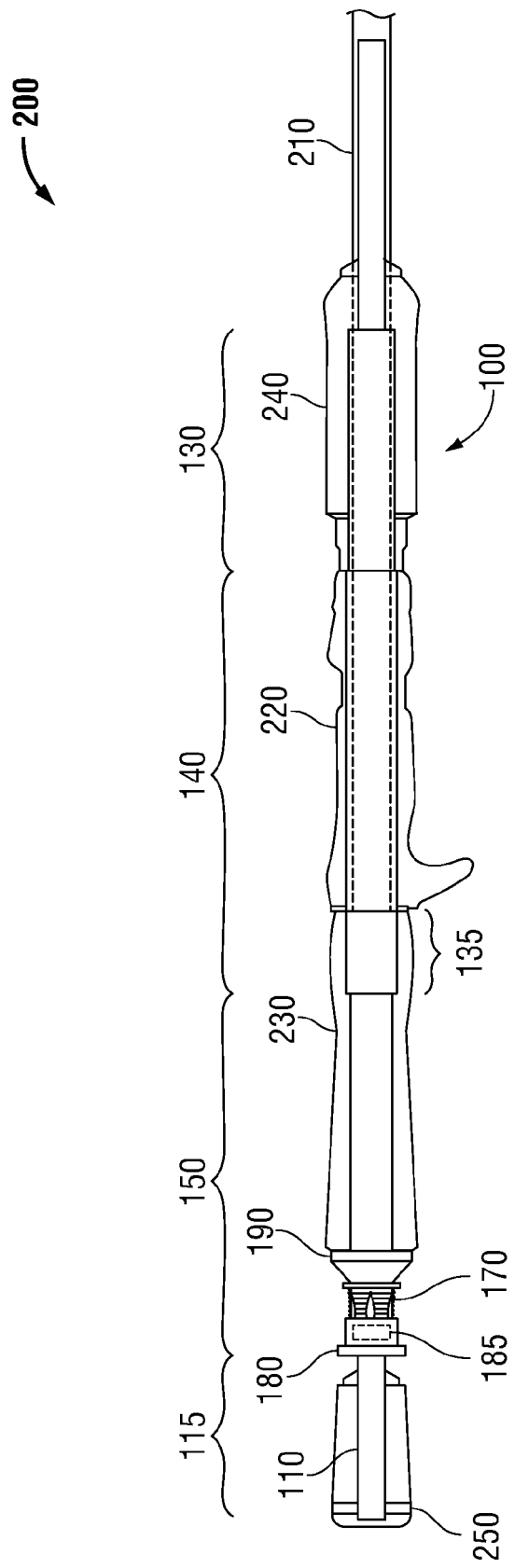
FIG. 2 shows a fishing rig using the fishing rod foundation of FIG. 1. according to one embodiment of the present disclosure.

FIG. 2 shows an exemplary fishing rig 200 based on fishing rod foundation 100 according to one embodiment of the present disclosure. A rod blank 210 is shown inserted into at least the first portion 130. The rod blank 210 may also be received into at least part of the second portion 140 and may be stopped from moving further along the tubular 120 by the blank stop 145 (see FIG. 1). In some embodiments, at least one of the first portion 130 and the second portion 140 may be configured to reinforce the rod blank 210. In some embodiments, the cylindrical element 110 may be disposed in contact with the rod blank 220 within the tubular 120. Tubular 120 may be configured to communicate vibrations from the rod blank 210 into the cylindrical element 110 and into the extended length 115. In some embodiments, the cylindrical element 110 may be configured and positioned to amplify vibrations received from the rod blank 210, thus increasing overall sensitivity of the fishing rig 200. The vibrations may be communicated from the rod blank 210 to the cylindrical element 110 through tubular 120 due to contact between the rod blank 210 and the blank stop 145.

Additional fishing rod elements may be installed on the fishing rod foundation 100. For example, a reel seat 220 may be disposed on the second portion 140. A rear grip 230 may be disposed on the third portion 150 between the stop 190 and the reel seat 220. The first portion 130 may be configured to receive a fore grip 240. A fighting butt 250 may be disposed on the extended length 115 of the cylindrical element 110. In some embodiments, the fighting butt 250 may include a weight. In some embodiments, vibrations in the rod blank 210 may be communicated through tubular 120 and then amplified by the cylindrical element 110 and transmitted into the fighting butt 250.

The extended length 115 may be adjusted by moving the releasing the locking nut 180 and sliding the cylindrical element 110 into or out of the tubular 120. The length 115 may be adjusted for numerous purposes, including, but not limited to, one or more of: i) center of mass of the fishing rig, ii) casting torque; iii) bait weight, iv) catch weight, v) arm length, and vi) user height. By adjusting length 115, a single fishing rig 200 may be used by multiple persons with different heights/arm lengths, and a single person may use a single fishing rig 200 for multiple purposes (different baits, catches, casting conditions, etc.).

Figure 3:
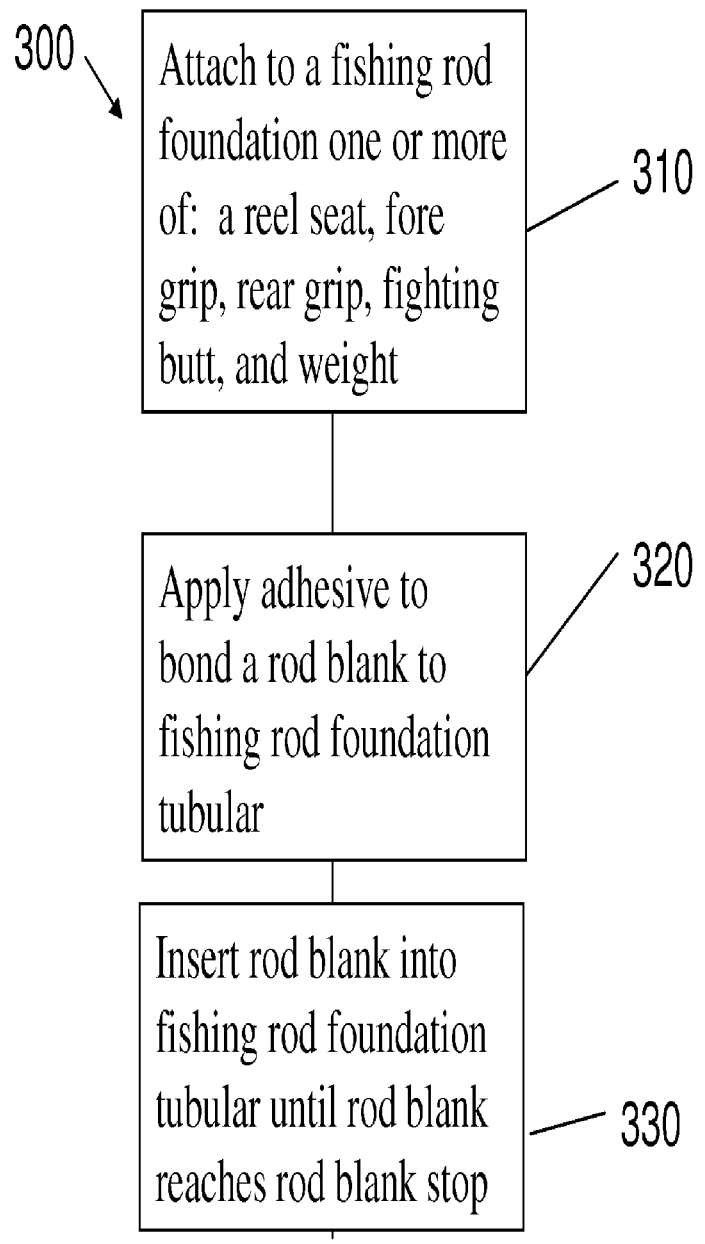

FIG. 3 shows a flow chart of a method 300 for constructing a fishing rig 200 according to one embodiment of the pending disclosure. In step 310, one or more fishing rod attachments may be disposed on the fishing rod foundation 100. The fishing rod attachments may include, but are not limited to, i) a reel seat, ii) a fore grip, iii) a rear grip, iv) a fighting butt, and v) a weight. In step 320, an adhesive material may be added to either the base of rod blank 210 or in the tubular 120 of fishing rod foundation 100 so that an adhesive bond may be formed between the rod blank 210 and the tubular 120. In step 330, the rod blank 210 may be inserted into the tubular 120 until the rod blank 210 reaches the rod blank stop 145. In some embodiments, vibrations from the rod blank 210 may be communicated to the tubular 120 through the contact between the rod blank 210 and the rod blank stop 145. The fishing rod foundation 100 may include a cylindrical element 110 configured for insertion into the tubular 120. The tubular 120 may include at least first portion 130, a second portion 140, and a third portion 150. Insertion of the rod blank 210 may include insertion into the first portion 130 and, optionally, the second portion 140. The rod blank stop 145 may be located at a narrowed interior diameter section 135 within either the first portion 130 or the second portion 140.

Figure 4:
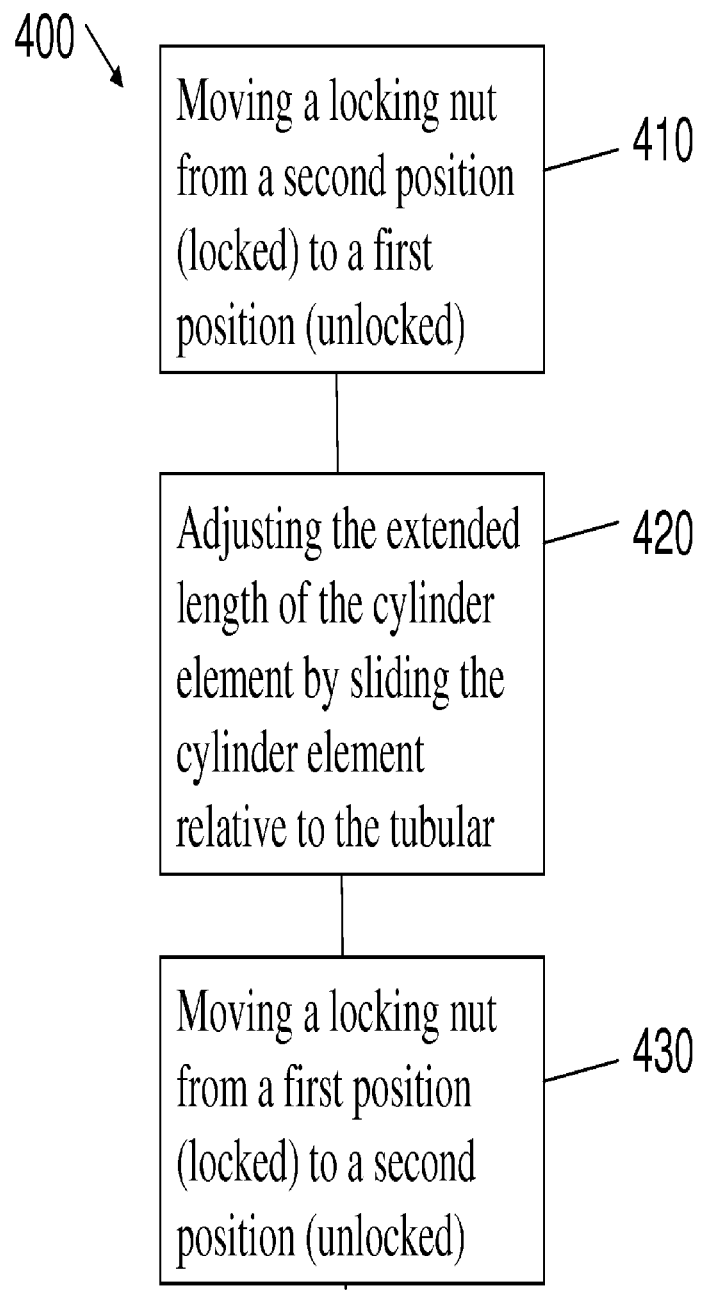
FIG. 4 shows a flow chart of a method for adjusting a fishing rig using the fishing rod foundation according to one embodiment of the present disclosure.

FIG. 4 shows a flow chart of a method 400 for adjusting the according to one embodiment of the pending disclosure. In step 410, the locking nut 180 may be moved from a second position (locked) to a first position (unlocked). In step 420, the cylindrical element 110 may be moved relative to the tubular 120. The movement may include sliding the cylindrical element 110 to increase or decrease the extended length 115. In step 430, the locking nut 180 may be moved from the first position (unlocked) to the second position (locked). The locking nut 180 may be engaged to the threaded section 170 of the third portion 150 of the tubular 120. The movement of the locking nut 180 in steps 410 and 430 may include twisting the locking nut 180 to move along the threaded path of the threaded section 170. In some embodiments, steps 410 and 430 may, optionally, include adjusting pressure on the ring 185 disposed between the locking nut 180 and the cylindrical member 110. In some embodiments, steps 410 and 430 may includes adjusting compression of the threaded section 170 such that friction between the interior of the third potion 150 and the cylindrical element 110 will allow sliding movement and restrict movement, respectively.

While the disclosure has been described with reference to exemplary embodiments, it will be understood that various changes may be made and equivalents may be substituted for elements thereof without departing from the scope of the disclosure. In addition, many modifications will be appreciated to adapt a particular instrument, situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A fishing rod foundation, comprising:
    a cylindrical element;
    a tubular configured to receive the cylindrical element, the tubular comprising:
        a first tubular portion with a first interior diameter greater than an exterior diameter of the cylindrical element,
        a second tubular portion adjacent to the first tubular portion, wherein at least part of the second tubular portion has a second interior diameter that is smaller than the first interior diameter, and
        a third tubular portion with a threaded area and adjacent to the second tubular portion; and
    a locking nut configured to form an engagement with the threaded area of the third portion, the engagement having a first position and a second position, where the first position allows the cylindrical element to slide within the tubular and the second position restricts movement of the cylindrical element within the tubular, wherein the cylindrical element is dimensioned to protrude from both ends of the tubular in at least one position, and wherein the cylindrical element is configured to protrude at least partially into a rod blank.

2. The fishing rod foundation of claim 1, wherein the first interior diameter is larger than an exterior diameter of the rod blank and the second interior diameter is smaller than the exterior diameter of the rod blank.

3. The fishing rod foundation of claim 1, wherein the first tubular portion is configured to receive the rod blank.

4. The fishing rod foundation of claim 3, wherein the first tubular portion is configured to reinforce the received rod blank.

5. The fishing rod foundation of claim 1, wherein at least part of the third portion is configured to be compressed when the locking nut is in the second position.

6. The fishing rod foundation of claim 5, wherein the at least part of the third portion includes at least one gap in a surface of the third portion configured to allow compression of the third portion.

7. The fishing rod foundation of claim 1, wherein the first portion has a first exterior diameter and at least part of the second portion has a second exterior diameter and the first exterior diameter is smaller than the second exterior diameter.

8. The fishing rod foundation of claim 1, wherein at least one of the tubular and the cylindrical element is substantially made of a lightweight material.

9. The fishing rod foundation of claim 8, wherein the lightweight material includes at least one of: i) aerospace aluminum, ii) magnesium alloy, iii) titanium, and iv) graphite.

10. The fishing rod foundation of claim 1, wherein the third portion has a third interior diameter and the cylindrical element has an exterior diameter that is smaller than the second interior diameter and the third interior diameter.

11. The fishing rod foundation of claim 1, wherein at least part of the third portion has a third interior diameter and the third diameter is equal to the second interior diameter.

12. The fishing rod foundation of claim 1, wherein the tubular is formed as a single piece.

13. The fishing rod foundation of claim 1, wherein the cylindrical element is one of: i) a solid rod and ii) at least partly tubular.

14. The fishing rod foundation of claim 1, further comprising:
    a ring disposed on the cylindrical element and disposed between the locking nut and the cylindrical element.

15. The fishing rod foundation of claim 14, wherein the ring includes an elastomeric material.

16. The fishing rod foundation of claim 14, wherein the ring is configured to reduce abrasion of the cylindrical element.

17. The fishing rod foundation of claim 1, wherein a portion of the cylindrical element extends outside the tubular.

18. The fishing rod foundation of claim 17, wherein the extended portion of the cylindrical element is configured to receive at least one of: i) a fighting butt, ii) a cork, and iii) a weight.

19. A method of constructing a fishing rig, the method comprising:
   inserting a rod blank into a fishing rod foundation, wherein the fishing rod foundation comprises:
   a cylindrical element;
   a tubular configured to receive the cylindrical element, the tubular comprising:
      a first tubular portion with a first interior diameter greater than an exterior diameter of the cylindrical element,
      a second tubular portion adjacent to the first tubular portion, wherein at least part of the second tubular portion has a second interior diameter that is smaller than the first interior diameter, and
      a third tubular portion with a threaded area and adjacent to the second tubular portion; and
   a locking nut configured to form an engagement with the threaded area of the third portion, the engagement having a first position and a second position, where the first position allows the cylindrical element to slide within the tubular and the second position restricts movement of the cylindrical element within the tubular, wherein the cylindrical element is dimensioned to protrude from both ends of the tubular in at least one position, and wherein the cylindrical element is configured to protrude at least partially into the rod blank.

20. The method of claim 19, wherein the step of inserting the rod blank into the fishing rod foundation comprises:
   receiving the rod blank into at least the first portion of the tubular.

21. The method of claim 20, wherein the step of inserting the rod blank into the fishing rod foundation further comprises:
   receiving the rod blank into the second portion of the tubular.

22. The method of claim 20, wherein the step of inserting the rod blank into the fishing rod foundation further comprises:
   receiving the rod blank into the cylindrical element, wherein the cylindrical element is at least partly tubular.

23. The method of claim 19, wherein a portion of the cylindrical element extends beyond the tubular, and further comprising:
   disposing a butt on the extended portion of the cylindrical element.

24. The method of claim 19, further comprising:
   disposing on the tubular at least one of: i) a grip, ii) a reel seat, and iii) a rod extender.

25. A method of adjusting a fishing rig,
   wherein the fishing rig comprises:
   a cylindrical element;
   a tubular configured to receive the cylindrical element, the tubular comprising:
      a first tubular portion with a first interior diameter greater than an exterior diameter of the cylindrical element,
      a second tubular portion adjacent to the first tubular portion, wherein at least part of the second tubular portion has a second interior diameter that is smaller than the first interior diameter, and
      a third tubular portion with a threaded area and adjacent to the second tubular portion;
   a locking nut configured to form an engagement with the threaded area of the third portion, the engagement having a first position and a second position, where the first position allows the cylindrical element to slide within the tubular and the second position restricts movement of the cylindrical element within the tubular, wherein the cylindrical element is dimensioned to protrude from both ends of the tubular in at least one position, and wherein the cylindrical element is configured to protrude at least partially in a rod blank;
   the rod blank disposed in the first portion; and
   a weight disposed on a portion of the cylindrical element extending beyond the tubular; and
   the method comprising:
   sliding the cylindrical element relative to the tubular to change a length of the extended portion from a first length to a second length.

26. The method of claim 25, further comprising:
   moving the locking nut from the first position to the second position.

27. The method of claim 25, further comprising:
   moving the locking nut from the second position to the first position.

* * * * *